United States Patent

Nagano et al.

[15] 3,683,370

[45] Aug. 8, 1972

[54] INPUT DEVICE

[72] Inventors: Akira Nagano; Nobukata Ninomiya; Masatsugu Miura, all of Kyoto, Japan

[73] Assignee: Omran Tateisi Electronics Co., Kyoto, Japan

[22] Filed: March 25, 1971

[21] Appl. No.: 127,940

[30] Foreign Application Priority Data

March 26, 1970 Japan ......................25801/70

[52] U.S. Cl. ..........340/365, 235/153, 340/146.1 AB

[51] Int. Cl. ..............................................G08c 1/00

[58] Field of Search......340/365, 347 DD, 146.1 AB; 235/153

[56] References Cited

UNITED STATES PATENTS 2,718,633 9/1955 Fennessy.............340/347 DD 3,483,553 12/1969 Blankenbarker..........340/365

*Primary Examiner*—John W. Caldwell

*Assistant Examiner*—Robert J. Mooney

*Attorney*—Craig, Antonelli, Stewart & Hill

[57] ABSTRACT

An improved input device for use in an electronic calculating machine or any other keyboard signal sender having a plurality of character keys on the keyboard, which permits such machine or instrument to function its own operation without fault or error even when a plurality of keys are operated about at the same time successively in rapid sequence, that is, rolled over. It has been well known that, when contact circuits associated with relevant character keys that has been operated at the same time are completed about at the same time for a certain period of time, the machine or instrument will produce an erroneous result or otherwise malfunction. According to the present invention, to avoid this disadvantage, this input device is interposed between the keyboard and the binary encoding device heretofore generally used.

4 Claims, 3 Drawing Figures

INVENTORS

Figure 1:
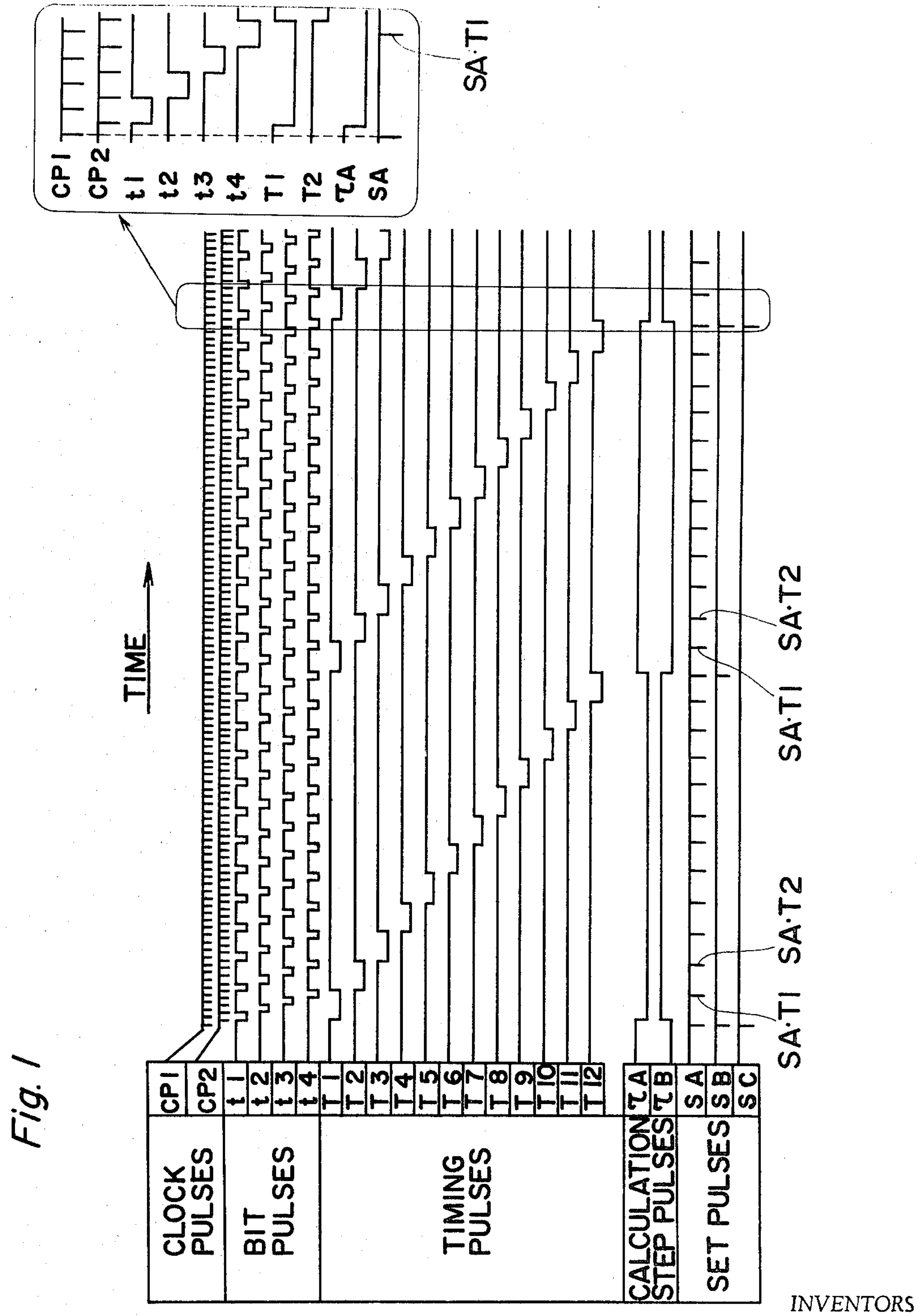

AKIRA NAGANO, NOBUKATA NINOMIYA
AND MASATSUGU MIURA

BY

Craig, Antonelli, Stewart & Hill
ATTORNEYS

INVENTORS

AKIRA NAGANO, NOBUKATA NINOMIYA AND MASATSUGU MIURA

BY Craig, Antonelli, Stewart & Hill
ATTORNEYS

INVENTORS

AKIRA NAGANO, NOBUKATA NINOMIYA
AND MASATSUGU MIURA

BY Craig, Antonelli, Stewart & Hill
ATTORNEYS

INPUT DEVICE

The present invention relates to an input device of the character generally employed in an electronic desk top calculator and, more particularly, to such an input device having a plurality of contact circuits associated with a corresponding number of character keys, wherein each input signal inserted in the calculator can be transferred from one stage to another without fault even when two or more character keys are operated about the same time in succession.

In an attempt to speed up the calculation with the use of an electronic calculator, two or more keys are sometimes rapidly operated about the same time in succession. Such condition of operation is generally referred to as "two key roll-over" in case where two keys are involved, wherein contact circuits associated with relevant two character keys on the keyboard are synchronously completed for a certain period of time despite of the fact that these two keys are successively operated in a rapid sequence.

In fact, when a plurality of key contact circuits are synchronously completed upon operation of the relevant keys on the keyboard even for a certain period of time, an exemplary type of conventional electronic calculator will produce an erroneous result or otherwise malfunctions.

In order to eliminate this inconvenience inherent to the conventional calculator of the type above referred to, an improvement has been proposed wherein the calculator is provided with means for issuing a warning signal indicative of the synchronous completion of a plurality of key contact circuits so that an operator of the calculator can be warned of his fault in operation. Even in this case, once the warning signal is generated, the operator is compelled to clear the machine to remove, at the time he is warned of his fault in operation, all of the input signals that have been inserted in the machine, then to re-start the operation.

Accordingly, the present invention has for its essential object to provide an input device for use in an electronic calculating machine of the type above referred to in which the calculating operation of the machine can proceed to produce a correct result without fault even if a plurality of keys are rolled over in the course of operation.

Another object of the present invention is to provide an input device for use in an electronic calculating machine of the type above referred to wherein means is provided for transferring each input signal, that has been inserted in the calculating machine, from one stage to another without fault even when contact circuits associated with relevant character keys on the keyboard are synchronously completed for a certain period of time in an attempt to speed up the calculation in such a manner that the relevant character keys are successively operated in a rapid sequence.

Figure 2:
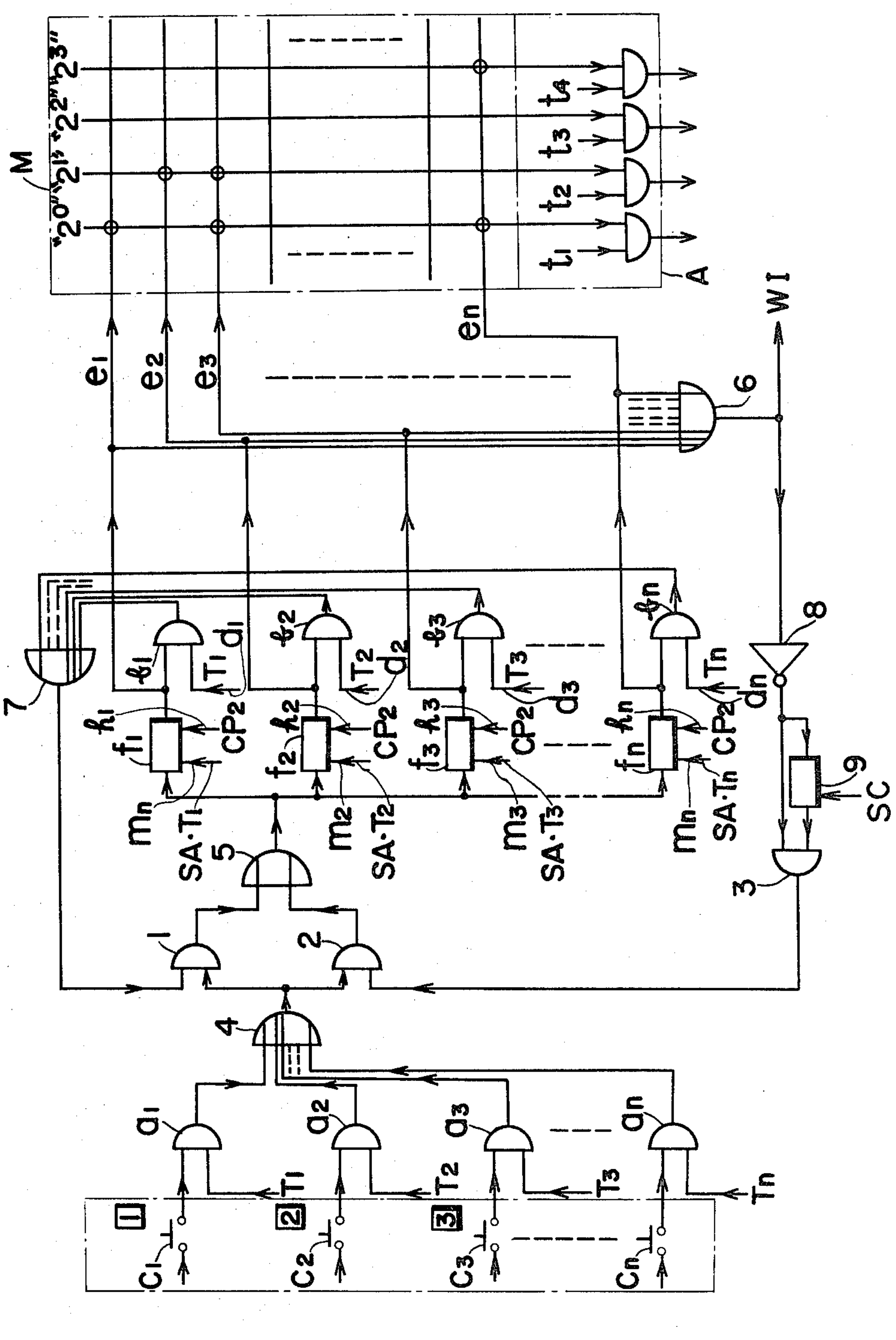
Figure 3:
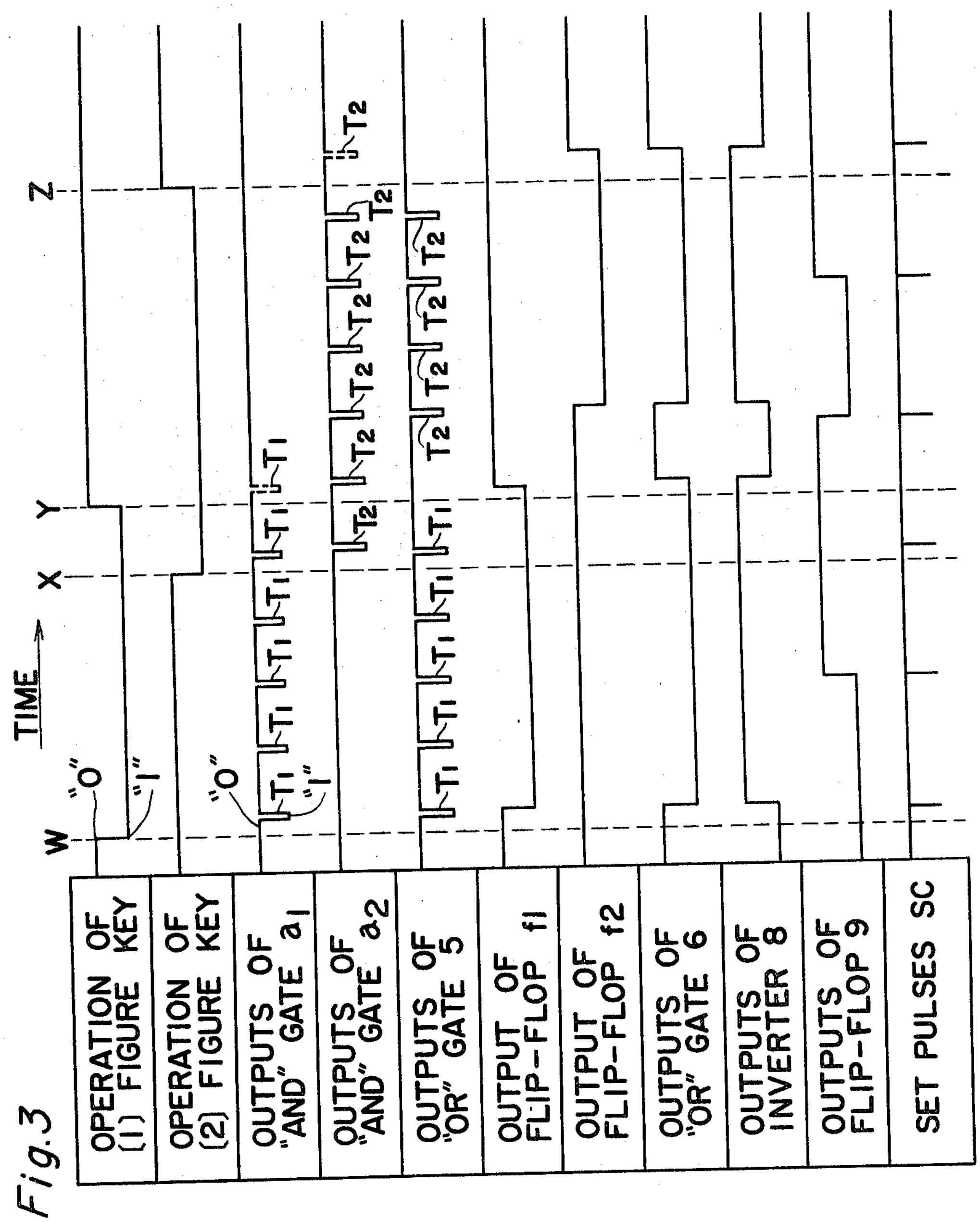

These and other object and features of the present invention will become apparent from the following description taken in conjunction with a preferred embodiment for the purpose of illustration with reference to the accompanying drawings, in which;

FIG. 1 is a schematic diagram of various pulse trains employed in the present invention shown in timing relation with respect to one another, FIG. 2 is a circuit diagram of an input device constructed in accordance with the teachings of the present invention, and FIG. 3 is a schematic diagram of wave form of pulse trains shown in timing relation for better understanding of the operation of the input device shown in FIG. 2.

Since a dynamic synchronous system heretofore largely known to those skilled in the art is also employed in the input device of the present invention, various kinds of pulses are used to control the system and to proceed the calculating operation. For better understanding of the present invention, each of those pulses employed is defined as follows with reference to FIG. 1.

Two series of clock pulses CP1 and CP2 are used to determine the pulse time of various pulses as mentioned below. These series of clock pulses CP1 and CP2 have the same value of pulse intervals, and each pulses CP1 is generated earlier than the pulses CP2 by a certain time, for example, one-fourth of the pulse interval.

Four series of bit pulses $t1$, $t2$, $t3$ and $t4$ are adapted to be generated in a specified order successively in synchronism with each corresponding clock pulse CP2. The pulse width of each series of the bit pulses $t1$, $t2$, $t3$ and $t4$ is substantially equal to the pulse interval of each clock pulse CP2. These series of bit pulses $t1$, $t2$, $t3$ and $t4$ represent binary coded signals of "$2^0$," "$2^1$," "$2^2$" and "$2^3$" positions, respectively.

Series of timing pulses T1, T2, ... T11 and T12 which are shown as including 12 series in FIG. 1 are usually generated in a specified order in succession during one step of operation of the system. The pulse width of each timing pulse is substantially equal to the sum of pulse widths of the four bit pulses $t1$ through $t4$ representing one decimal digit or function symbol that has been inserted in the electronic calculating machine.

Series of calculation step pulses $\tau$A and $\tau$B have a pulse width of the value equal to the sum of pulse widths of the timing pulses T1 through T12 and representing one step of calculation performed by the calculating machine.

Series of set pulses SA, SB and SC which are synchronized to clock pulses CP1 are used to set or reset flip-flops employed in the calculating machine. Of them, each of the set pulses SA has a pulse interval substantially equal to the pulse width of each of the timing pulses T1 through T12. However, the time at which each set pulse SA is generated is somewhat delayed relative to that of each of the timing pulses T1 through T12. The set pulses SB have a pulse interval substantially equal to one step of transferrence of the timing pulses T1 through T12 and are generated at intervals of the number of the series of the timing pulses employed, and the set pulses SC have a pulse interval equal to the sum of respective pulse widths of the calculation step pulses $\tau$A and $\tau$B, that is, twice of the pulse interval of the set pulses SB.

Referring now to FIG. 2, the input device of the present invention so far illustrated includes a plurality of key contacts $C_1$ through $C_n$ and the corresponding number of "and" gates $a_1$ through $a_n$ is provided. Each of these "and" gates $a_1$ through $a_n$ has one input terminal connected with the corresponding key contact and the other input terminal connected with a timing pulse generator (not shown) effective to apply the timing pulses T1 through T12 to said "and" gates $a_1$ through $a_n$, respectively, (if $n$ is equal to the number of the series of the timing pulses employed). The output terminals of these "and" gates are connected with respective input terminals of an "or" gate 4 which is in turn connected in shunt with respective input terminals of individual "and" gates 1 and 2. Output terminals of these "and" gates 1 and 2 are connected with respective input terminals of an "or" gate 5. The output terminal of the "or" gate 5 is connected in shunt with a plurality of input terminals of flip-flops $f_1$ through $f_n$, output terminals of these flip-flops being in turn connected with respective input terminals of "and" gates $b_1$ through $b_n$. These "and" gates $b_1$ through $b_n$ have the other input terminals to which the timing pulses T1 through T$n$ can be applied by means of lines $d_1$ through $d_n$ connected with the timing pulse generator (not shown), respectively. The output terminals of these "and" gates $b_1$ through $b_n$ are in turn connected with respective input terminals of a single "or" gate 7.

The output terminals of the flip-flops $f_1$ through $f_n$ are also connected with respective input terminals of a single "or" gate 6 and with respective input lines $e_1$ through $e_n$ of a binary encoding matrix M of known construction.

The flip-flop $f_1$ can be operated in such a manner that, when a set pulse SA·T1 of a series of the set pulse SA is applied thereto by means of a line $m_1$, the flip-flop can be brought into a state ready to read in an input signal from the "or" gate 5 and, whenever the clock pulses CP2 are applied the flip-flop by means of a line $h_1$, the flip-flop can be brought into a state ready to read-out the input signal that has been transferred thereto. Similarly, this mode of operation may take place in the remaining flip-flops $f_2$ through $f_n$ by means of respective lines $m_2$ through $m_n$ and $h_2$ through $h_n$, and therefore description of this mode of operation of each of the remaining flip-flops is herein omitted.

The output terminal of the "or" gate 7 is connected with the other input terminal of the "and" gate 1 while the output terminal of the "or" gate 6 is connected with an input terminal of an inverter 8 which is in turn connected in shunt with one of two input terminals of an "and" gate 3 and the input terminal of a flip-flop 9, the output terminal of said flip-flop being connected with the other input terminal of said "and" gate 3. The output terminal of said "and" gate 3 is in turn connected with the other input terminal of the "and" gate 2. The flip-flop 9 can be operated in such a manner that, when series of set pulses SC are applied thereto, the flip-flop can be brought into a state ready to read out the input signal that has been transferred thereto.

While the input device of the present invention is constructed as hereinbefore described, the operation will proceed in the following manner.

So long as no character keys are operated while the calculating machine is in the operative condition, no input signal can be applied to the flip-flops $f_1$ through $f_n$ and, therefore, the output of the inverter 8 is "1" so that the output of the "and" gate 3 is "1," while the output of the "or" gate 7 is "0."

If any one of the character keys, for example, a [1] figure key, is operated to close the key contact $C_1$, the corresponding "and" gate $a_1$ will produce a signal representative of the logical product of a signal from the key contact $C_1$ by the timing pulse T1. The wave form of this signal produced by the "and" gate $a_1$ is shown in FIG. 3. An output signal of the "and" gate $a_1$ can be directly applied to the input terminals of the "and" gates 1 and 2, respectively, through the "or" gate 4. However, since an output signal has been applied to the gate 2 from the "and" gate 3, only the gate 2 permits the passage of the input signal therethrough on to the "or" gate 5 which is in turn transmitted to the respective input terminals of the flip-flops $f_1$ through $f_n$.

Since the input signal representative of the operation of the [1] figure key is associated with the timing pulse T1, one of the flip-flops $f_1$ associated with the [1] figure key can be brought into a state ready to read in the input signal by a set pulse SA·T1 applied to said flip-flop $f_1$ by means of the line $m_1$ during the depression of [1] figure key.

The input signal of the wave form, as shown in FIG. 3, which is read-out from the flip-flop $f_1$ upon application of the clock pulse CP2 to said flip-flop $f_1$ is then fed to the input terminal of the "or" gate 6 and the binary encoding matrix M. The input signal fed to the matrix M is then fed to an "and" circuitry A from which a binary coded signal representative of one decimal digit [1] can be obtained. On the other hand, the same input signal fed to the "or" gate 6 can be obtained therefrom in the form of a signal WI indicative of the operation of the relevant key which may be utilized to control the following stage such as comprising a control circuit.

The input signal emerging from the flip-flop $f_1$ can be also applied to the input terminal of the "and" gate $b_1$. However, since the timing pulse T1 is at this time fed to the other terminal of said gate $b_1$ by means of the line $d_1$, this gate $b_1$ can produce a signal representative of the logical product of the input signal by the timing pulse T1 which is in turn fed to the corresponding input terminal of the "and" gate 1 through the "or" gate 7, resulting in that the output of the "and" gate 1 becomes "1." On the other hand, when the flip-flop $f_1$ is brought into a state ready to read in the input signal as hereinbefore described, this input signal can be transmitted to the input terminal of the inverter 8 through the "or" gate 6. Accordingly, the output of the inverter 8 becomes "0" and the output of the "and" gate 3 then becomes " 0." Thus, the "and" gate 2 is closed and the "and" gate 1 is opened to permit the input signals from the "and" gate $a_1$ to be applied to the "or" gate 5 through the "and" gate 1 during the duration of each timing pulse T1.

It will be clearly understood that, so long as the [1] figure key is operated, the binary coded signal representative of the decimal digit [1] can be obtained from the "and" circuitry A through the binary encoding matrix M.

However, if another character key, for example, a [2] figure key, is subsequently operated before the initially operated [1] figure key is completely released, that is, the relevant two key contacts $C_1$ and $C_2$ are closed at the same time for a certain period of time, for example, at the time X as indicated in FIG. 3, the corresponding "and" gate $a_2$ will produce a signal representative of the logical product of an input signal from the contact $C_2$ by the timing pulse T2 applied thereto while the "and" gate $a_1$ is in the condition as hereinbefore described. The wave form of the output of the "and" gate $a_2$ is illustrated in FIG. 3 and this output can be fed to the respective input terminals of the "and" gate 1 and 2. Since the other terminal of the "and" gate 2 connected with the "and" gate 3 is applied with a signal "0" from the "and" gate 3 at this time, the output signal from the "or" gate 4 can be received by the corresponding input terminal of the "and" gate 1. However since this gate 1 is adapted to receive the signals "1" and "0" from the "or" gate 7 during the duration of the timing pulses T1 and T2, respectively in an alternate manner, the output signal from the "or" gate 4 is inhibited to pass therethrough to the "or" gate 5 during the duration of the timing pulse T2.

When the [1] figure key is released at the time Y as shown in FIG. 3 while the [2] figure key is still depressed, the output of the "and" gate $a_1$ becomes "0," rendering the outputs of the "and" gate 1 and the "or" gate 5 to be respectively "0." Accordingly, the output of the "or" gate 7 also becomes "0" since the "and" gate $b_1$ no longer generate its output. On the other hand, as the flip-flop $f_1$ ceases to generate its output, the output of the "or" gate 6 then becomes "0" which is in turn inverted into "1" by the inverter 8. This output signal "1" of the inverter 8 is applied to the corresponding terminal of the "and" gate 3 and to the other terminal of said "and" gate 3 through the flip-flop 9. However, since this flip-flop 9 is adapted to be set by the set pulse SC, the output of the flip-flop 9 is delayed until the set pulse SC is applied thereto immediately after the output of the flip-flop $f_1$ has become "0." Accordingly, the output of the "and" gate 3 can become "1" after a lapse of time required until the set pulse $S^C$ is applied to the flip-flop 9.

When the output signal "1" from the "and" gate 3 is thus applied to the corresponding input terminal of the "and" gate 2, the latter can generate a signal representative of the logical product of the output signal "1" from the "and" gate 3 by the input signal that has been applied to the other input terminal of the "and" gate 2 as hereinbefore mentioned. This output signal from the "and" gate 2 is then fed to the respective input terminals of the flip-flop $f_1$ through $f_n$ through the "or" gate 5. However, only the flip-flop $f_2$, which is adapted to be brought into a state ready to read in a signal applied to the input terminal thereof when the set pulse SA·T2 is applied thereto by means of the line $m_2$ during the depression of the [2] figure key, reads in the signal transmitted from the "or" gate 5.

Upon application of the clock pulse CP2 to the flip-flop $f_2$ by means of the line $h_2$, the signal that has been read in to the flip-flop $f_2$ can be read out therefrom and then fed to the corresponding input terminal of the "or" gate 6 and the binary encoding matrix M. The input signal thus fed to the matrix M is then fed to the "and" circuitry A from which a binary coded signal representative of one decimal digit [2] can be obtained. On the other hand, the same input signal fed to the "or" gate 6 can be obtained therefrom in the form of a signal WI indicative of the operation of the relevant key which may be utilized to control the following stage such as comprising a control circuit in the same manner as hereinbefore described in connection with the operation of the [1] figure key.

While in this condition, the inverter 8 receives the signal "1" from the "or" gate 6 so that the output thereof is "0," resulting in that the output of the "and" gate 3 becomes "0." On the other hand, since the signal that has been read out from the flip-flop $f_2$ is also applied to the "and" gate $b_2$ which is in turn applied to the "or" gate 7, it will be clearly understood that the signal "1" can be obtained from the "or" gate 7 during the duration of the corresponding timing pulse $T_2$. In view of the fact that the signal "1" present between the output terminal of the "or" gate 7 and the corresponding input terminal of the "and" gate 1 is generated during the duration of the timing pulse T2, the signal WI can be obtained in order through the "and" gate 1, the "or" gate 5, the flip-flop $f_2$ and the "or" gate 6.

Although the present invention has been fully described by way of example wherein keys representative of numbers [1] and [2] are successively operated in rapid sequence, it is to be noted that the same may applicable where keys other than the hereinbefore recited are successively operated in rapid sequence. In addition, it is to be noted that the present invention can be applied not only to an electronic calculator of the character referred to, but also to a cash register or the like.

What is claimed is:

1. An input device adaptable in an electronic calculating machine for permiting such machine to function without error even when a plurality of character keys on the keyboard thereof are rolled over successively, which comprises a plurality of key contacts operatively associated with a corresponding number of character keys disposed on the keyboard of said machine, each of said key contacts including a first gate element having one input terminal connected with said key contact and the other input terminal connected with a timing pulse generator so that a corresponding one of a plurality of timing pulses generated by said timing pulse generator can be applied therethrough to said first gate element upon closure of the relevant key contact; a plurality of means for storing an input signal representative of the operation of any one of said character keys on the strength of one of the timing pulses associated with the operated character key in the event the input signal is applied thereto, the number of said storing means being associated with that of said character keys; first gate means having an input terminal adapted to receive outputs of said gate elements and the other input terminal adapted to receive outputs of said storing means, said first gate means being operable in response to one of said outputs of said storing means so as to supply the input signal representative of the operation of the relevant character key to each input terminal of said storing means; and second gate means having an input terminal adapted to receive outputs of said gate elements and the other input terminal adapted to receive, while said storing means generates its output, a timing pulse associated with the input signal that has been stored in said storing means, said second gate means being operable in response to the application of the timing pulse thereto so as to supply the input signal representative of the operation of the relevant character key to each input terminal of said storing means, whereby, in the event that the storing means does not generate the output signal, said first gate means is opened to supply the input signal representative of the initial operation of the key to said storing means and, in the event that the storing means generate the output signal to said first gate means, said first gate means is then closed to prevent the passage of said input signal therethrough during the application of the output signal from said storing means, but to permit said input signal to pass through said second gate means to said storing means, said first gate means being adapted to re-open to permit another input signal representative of the subsequent operation of a character key to pass therethrough to said storing means when the initially operated key is released.

2. An input device adaptable in an electronic calculating machine for permiting such machine to function without error even when a plurality of character keys on the keyboard thereof are rolled over successively, which comprises a plurality of key contacts operatively associated with a corresponding number of character keys disposed on the keyboard of said machine, each of said key contacts including a first gate element having one input terminal connected with said key contact and the other input terminal connected with a timing pulse generator so that a nal connected with a timing pulse generator so that a corresponding one of a plurality of timing pulses generated by said timing pulse generator can be applied therethrough to said first gate element upon closure of the relevant key contact; a plurality of means for storing an input signal representative of the operation of any one of said character keys on the strength of one of the timing pulses associated with the operated character key in the event the input signal is applied thereto, the number of said storing means being associated with that of said character keys; a first gate means having an input terminal adapted to receive outputs of said gate elements and the other input terminal adapted to receive outputs of said storing means, said first gate means being operable so as to close when said storing meang generates its output and to open after a lapse of certain time when said output of said storing means diminishes to supply the input signal representative of the operation of the relevant character key to each input terminal of said storing means; and a second gate means having an input terminal adapted to receive outputs of said gate elements and the other input terminal adapted to receive, while said storing means generates its output, a timing pulse associated with the input signal that has been stored in said storing means, said second gate means being operable in response to the application of the timing pulse thereto so as to supply the input signal representative of the operation of the relevant character key to each input terminal of said storing means, whereby, in the event that the storing means does not generate the output signal, said first gate means is opened to supply the input signal representative of the initial operation of the key to said storing means and, in the event that the storing means generate the output signal to said first gate means, said first gate means is then closed to prevent the passage of said input signal therethrough during the application of the output signal from said storing means, but to permit said input signal to pass through said second gate means to said storing means, said first gate means being adapted to re-open to permit another input signal representative of the subsequent operation of a character key to pass therethrough to said storing means after a certain period of time when the initially operated key is released.

3. An input device according to claim 2, wherein said first gate means includes an inverter capable of inverting the output signal from each of said storing means, a delay circuit adapted to delay a signal from said inverter, and an "and" gate element having one input terminal adapted to receive the input signal from said first gate elements and the other input terminal adapted to receive a delayed signal from said delay circuit.

4. An input device adaptable in an electronic calculating machine for permiting such machine to function without error even when a plurality of character keys on the keyboard thereof are rolled over successively, which comprises a plurality of key contacts operatively associated with a corresponding number of character keys disposed on the keyboard of said machine, each of said key contacts including an "and" gate element having one input terminal connected with said key contact and the other input terminal connected with a timing pulse generator so that a corresponding one of a plurality of timing pulses generated by said timing pulse generator can be applied therethrough to said "and" gate element upon closure of the relevant key contact; a first "or" gate element adapted to receive an output from a plurality of said "and" gate element; second and third "and" gate elements each having one input terminal adapted to receive an output from said first "or" gate element; a second "or" gate element adapted to receive outputs from said second and third "and" gate elements; a plurality of flip-flops adapted to receive an output from said second "or" gate element to treat an input signal, that has been fed thereto, on the strength of a relevant one of a plurality of the timing pulses associated with a character key that has been operated, the number of said flip-flops being associated with that of said key contacts; a plurality of fourth "and" gates associated with said flip-flops and each having an input terminal adapted to receive an output from the corresponding flip-flop and the other input terminal adapted to receive the corresponding timing pulse; a third "or" gate element adapted to receive each output from said flip-flops; an inverter adapted to receive an output from said third "or" gate; an additional flip-flop having one input terminal adapted to receive an output from said inverter and adapted to be set by a set pulse generated at the time of change-over of one calculation step; a fifth "and" gate having one input terminal adapted to receive the output from said inverter and the other input terminal adapted to receive an output from said additional flip-flop in a delayed relation with respect to the output from said inverter that has been applied to the first mentioned input terminal of said fifth "and" gate, an output terminal of said fifth "and" gate element being connected with the other input terminal of said third "and" gate so as to supply an output from said fifth "and" gate element to said third "and" gate; and a fourth "or" gate element having a plurality of input terminals adapted to receive respective outputs from said fourth "and" gate elements and one output terminal connected with the other input terminal of said second "and" gate element so as to supply an output from said fourth "or" gate element to said second "and" gate element.

* * * * *